United States Patent
Hayami et al.

(10) Patent No.: US 6,623,147 B2
(45) Date of Patent: Sep. 23, 2003

(54) VEHICLE LIGHTING APPARATUS

(75) Inventors: Toshihisa Hayami, Shizuoka (JP); Tetsuya Ishida, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/136,946

(22) Filed: May 1, 2002

(65) Prior Publication Data

US 2002/0163814 A1 Nov. 7, 2002

(30) Foreign Application Priority Data

May 7, 2001 (JP) ........................................ 2001-135898

(51) Int. Cl.[7] .............................................. B60Q 1/06
(52) U.S. Cl. ........................ 362/467; 362/466; 362/465; 362/524; 362/526; 362/525
(58) Field of Search ................. 362/464, 465, 362/466, 467, 514, 524, 525, 526, 286, 460, 523

(56) References Cited

U.S. PATENT DOCUMENTS 5,907,196 A * 5/1999 Hayami et al. ............. 362/466
6,280,070 B1 * 8/2001 Ishida et al. ................ 362/523
2002/0057572 A1 * 5/2002 Kondo et al. ............... 362/460

FOREIGN PATENT DOCUMENTS

DE 197 22717 A1 12/1997
JP 07-017322 1/1995 ........... B60Q/1/115

* cited by examiner

Primary Examiner—Stephen Husar
(74) Attorney, Agent, or Firm—Fish & Richardson P.C.

(57) ABSTRACT

A vehicle lighting apparatus includes abnormality detecting means for detecting abnormality in the AFS of the vehicle lighting apparatus, and means for adjusting optical axis of the lamp in the vertical direction for setting the angle of the optical axis of the lamp downward in the vertical direction in comparison with the reference angle upon receipt of abnormality-detected signal from the abnormality detecting means. When the vehicle lighting apparatus lapsed into malfunction, by tilting the optical axis of the lamp in the deflected state downward in the vertical direction, the lamp is prevented from dazzling oncoming cars even when the lamp is in the deflected state toward the oncoming cars, thereby realizing failsafe which is preferable in terms of traffic safety.

9 Claims, 14 Drawing Sheets

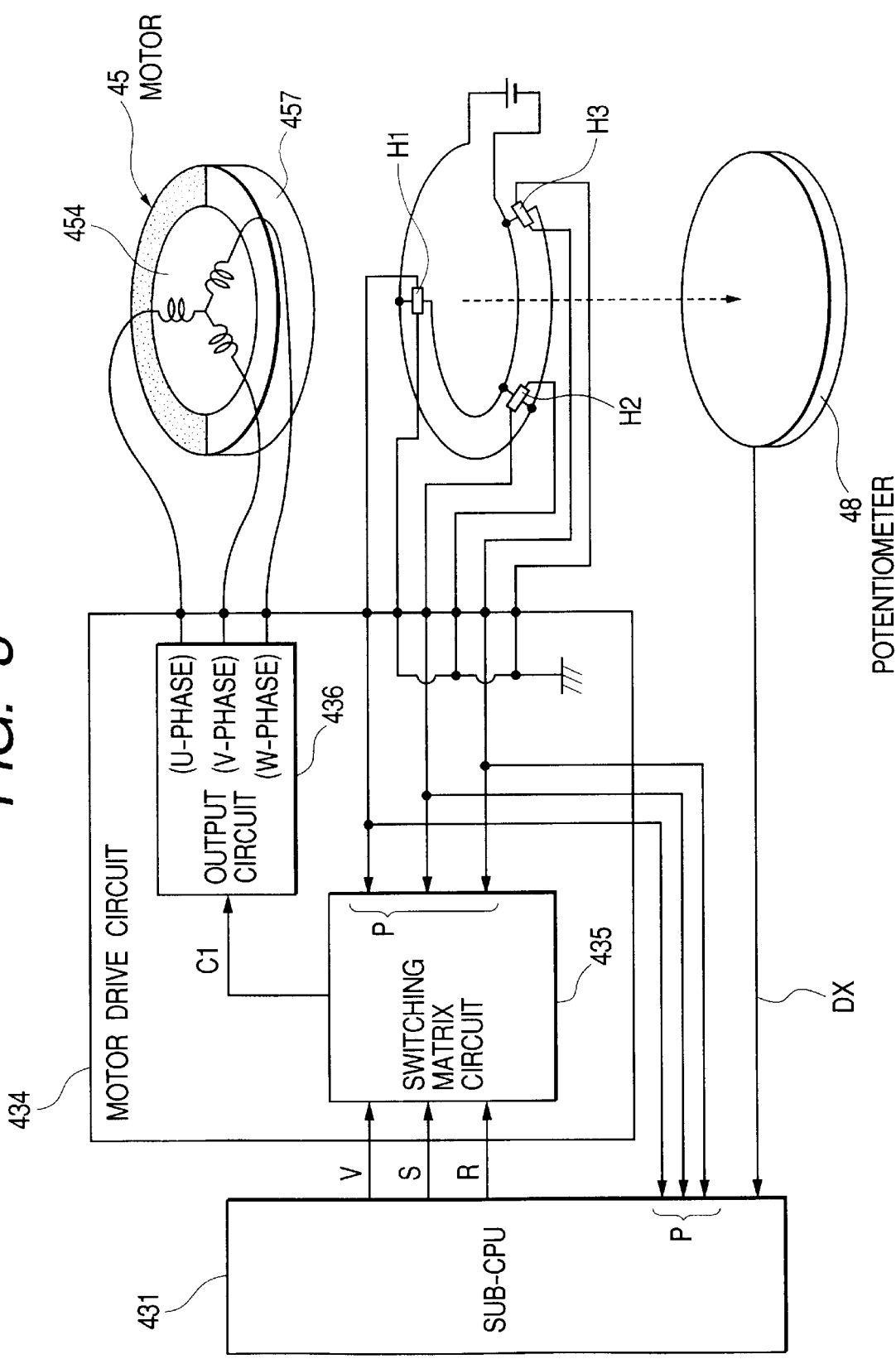

VEHICLE LIGHTING APPARATUS

BACKGROUND OF THE INVENTION

1. Field of the Invention

The present invention relates to a lighting apparatus for vehicles such as motor vehicles, and more specifically, to a vehicle lighting apparatus comprising lamp deflection angle controlling apparatus for controlling the changes in direction of beam of the lamp corresponding to the traveling conditions, for example, an adaptive front-lighting system (hereinafter referred to as AFS) for ensuring driving safety against a disorder occurred in the system.

2. Description of the Related Art

The AFS proposed for enhancing driving safety of motor vehicles detects information on the steering angle of the steering wheel SW of the motor vehicles, the vehicle speed, and other traveling conditions of the motor vehicles by the sensor 1, and the detected output is input to the electronic control unit 2 (hereinafter referred to as ECU) as shown in FIG. 1. The ECU 2 controls the swivel type lights 3R, 3L provided respectively on the left and right of the front portion of the motor vehicle, that is, the headlamps 3 that the direction of radiation can be deflected in the lateral direction based on the supplied sensor outputs. Such a headlamp may include, as a structure that can turn the reflector provided in the headlamp in the horizontal direction, a structure that can turn the reflector by the driving source such as a motor or the like. A mechanism for this turning is referred to as an actuator in this specification. According to the AFS in this type, when the motor vehicle travels on the curved road, the portion of the road ahead of the curve may be illuminated corresponding to the traveling speed of the motor vehicle, thereby effective in improving driving safety.

However, when a failure occurred in the AFS, especially when it became uncontrollable in a state in which the direction of radiation of the headlamp is deflected either to the left or the right with respect to the straight ahead direction of the motor vehicle, the forward of the motor vehicle cannot be illuminated when motor vehicle is driving straight ahead or turning along the curve in the opposite direction, or it may be fixed in the state of being deflected toward oncoming cars, which may dazzle the oncoming cars and thus deteriorate driving safety. Failures in the AFS includes, in the AFS shown in FIG. 1 for example, a case where the sensor 1 is broken down and thus the sensor outputs is not supplied from the sensor 1 to the ECU 2, a case where the ECU 2 is broken down, and a case where the actuator in the headlamp 3 is broken down, and in any cases, the AFS cannot function normally. Therefore, the AFS is required to have a capability that prevents deteriorating of safety even when a failure occurred, that is, failsafe capability.

SUMMARY OF THE INVENTION

The object of the present invention is to provide a vehicle lighting apparatus having failsafe capability ensuring driving safety even when a disorder occurred in the AFS.

According to the present invention, there is provided a vehicle lighting apparatus including lamp deflection angle controlling means for controlling the deflection angle of the lamp in the horizontal direction corresponding to the traveling conditions of the vehicle. The vehicle lighting apparatus comprises abnormality detecting means for detecting abnormality in the lamp deflection angle controlling means, and means for adjusting optical axis of the lamp in the vertical direction for setting the vertical angle of the optical axis of the lamp to the angular position lower than the reference angle upon receipt of abnormality-detected signal from the abnormality detecting means. The means for adjusting optical axis of the lamp in the vertical direction comprises for example a leveling mechanism for tilting the lamp in the vertically upward and downward directions, and adapted to tilt the optical axis of the lamp downward upon receipt of the system abnormality detected signal Preferably, the lamp deflection angle controlling means is adapted to be capable of controlling the deflection angles of a plurality of lamps provided in the vehicle, and the means for adjusting the optical axis of the lamp in the vertical direction is adapted to tilt the optical axes of the lamps other than those in abnormal condition downward and also in the lateral direction so that the lamp irradiates the front.

According to the present invention, when the AFS that constitutes the lamp deflection angle controlling means lapsed into malfunction, the optical axis of the lamp that is in the deflected state is tilted vertically downward, whereby the lamp is prevented from dazzling oncoming cars even when it is in the state of being deflected toward the oncoming cars, thereby realizing failsafe capability which is favorable in terms of traffic safety. In addition, by utilizing pulse signals supplied from the hall elements attached on the motor when controlling the revolution of the motor, additional components aside from the existing motor are not necessary, thereby preventing increase in complexity of construction and in the cost.

BRIEF DESCRIPTION OF THE DRAWINGS

FIG. 8 is a circuit diagram showing a circuit construction of the actuator according to the first embodiment.

DETAILED DESCRIPTION OF THE PREFERRED EMBODIMENTS

Figure 1:
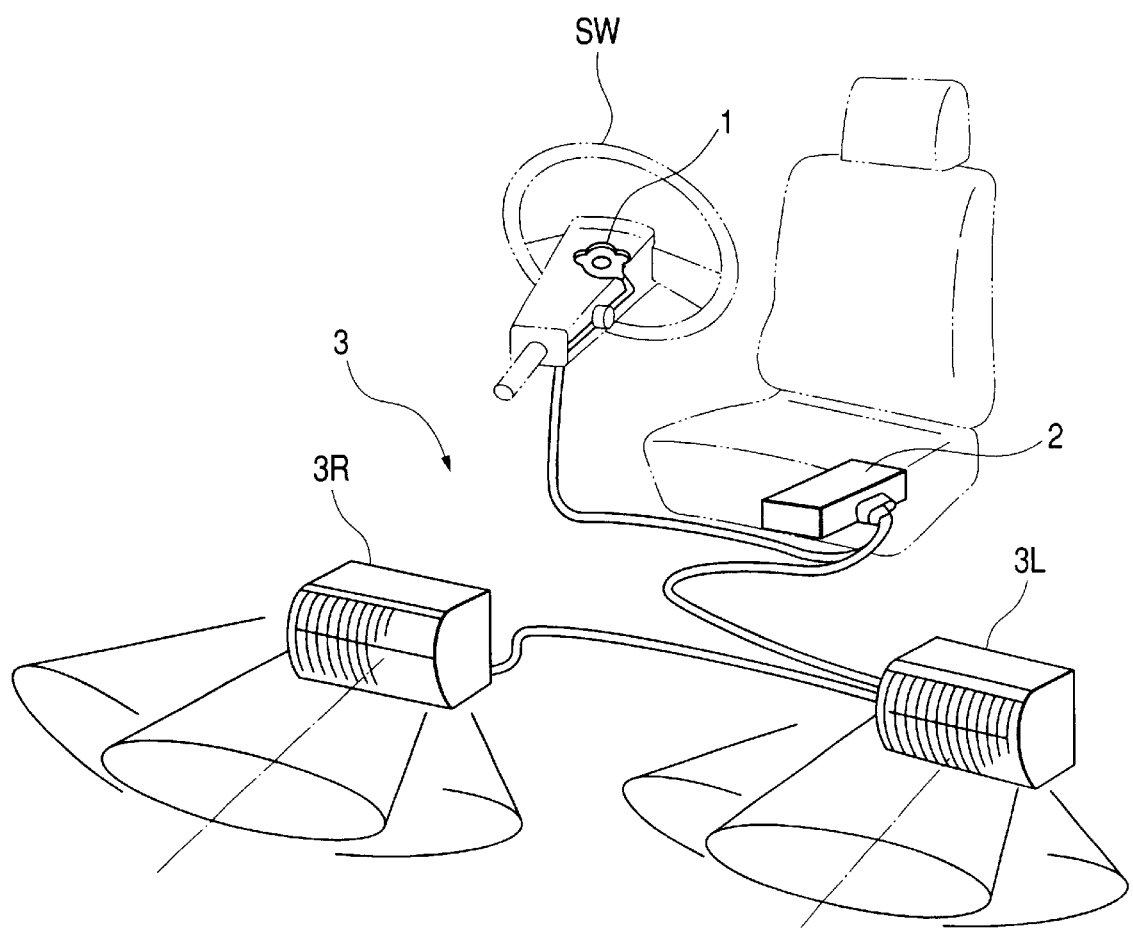
FIG. 1 is a drawing showing the conceptual construction of the AFS.
Figure 2:
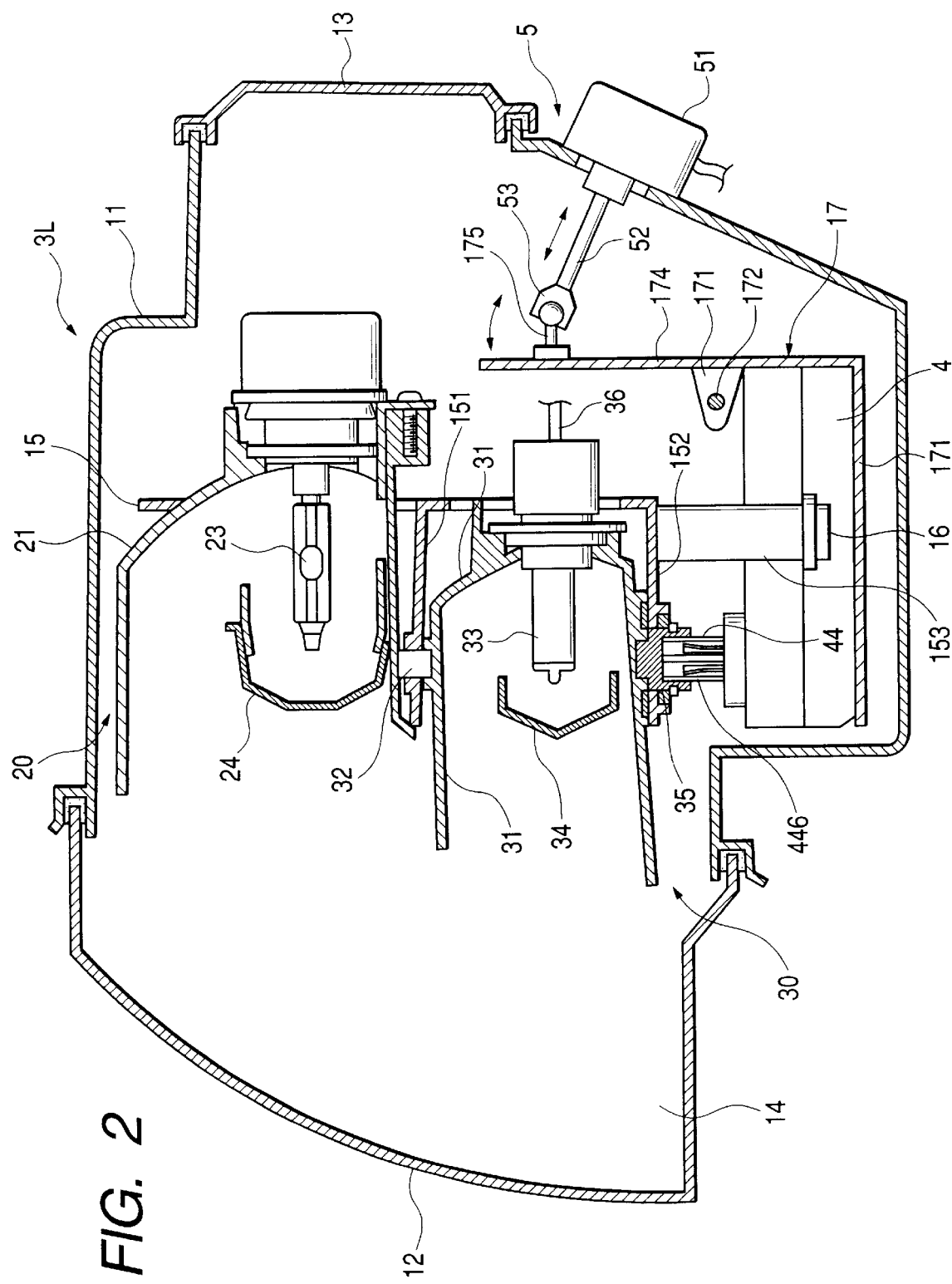
FIG. 2 is a vertical cross section of the swivel lamp according to a first embodiment.
Figure 3:
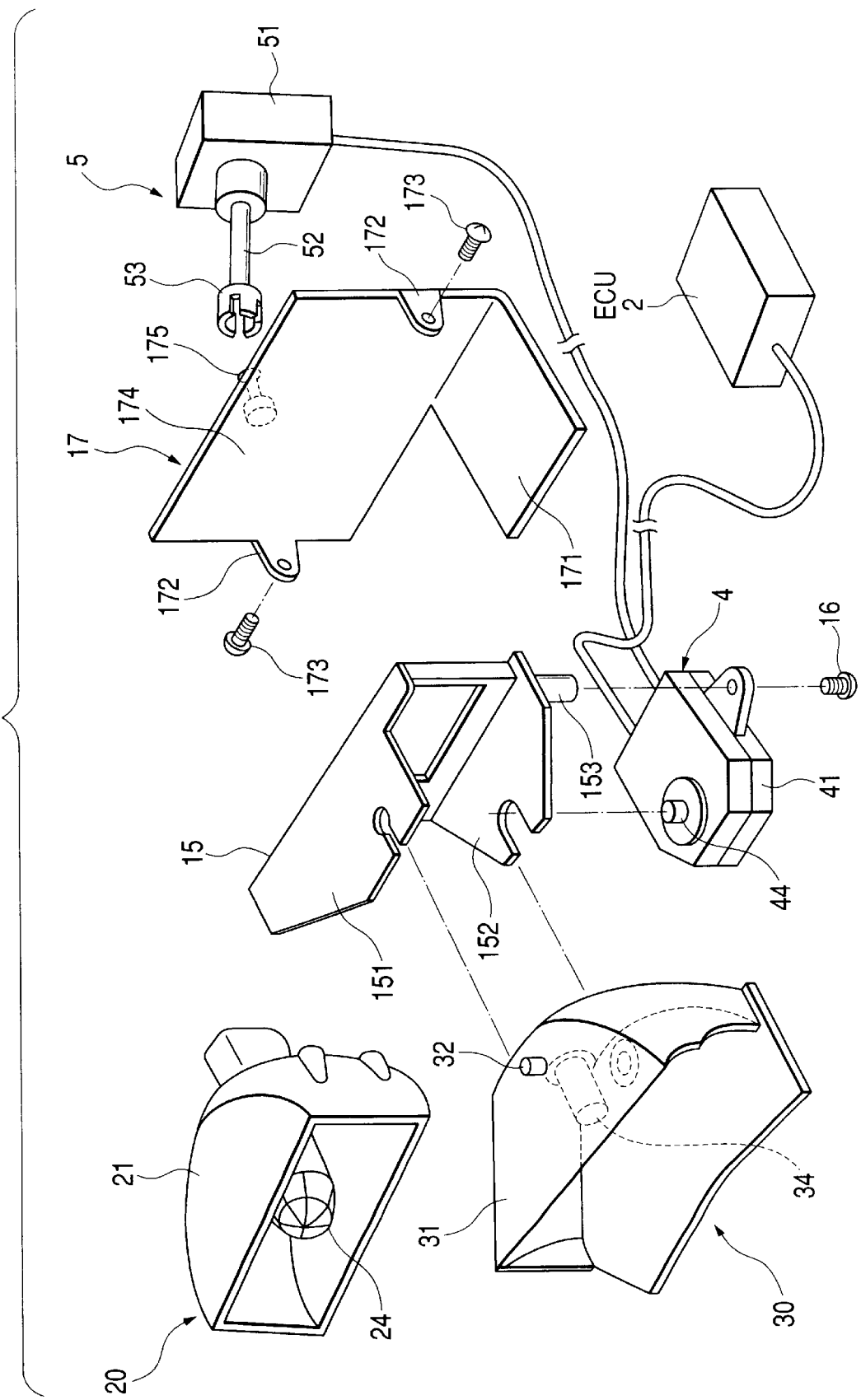
FIG. 3 is an exploded perspective view of the internal construction of the swivel lamp according to the first embodiment.

Referring now to the drawings, a first embodiment of the present invention will be described. FIG. 2 is a vertical cross section of the left lamp 3L of the headlamps constructed of swivel type lights of which the direction of radiation is deflectable toward the left and the right out of the components of the AFS as lamp deflection angle controlling means according to the present invention shown in FIG. 1, FIG. 3 is a partially exploded perspective view of the internal construction thereof. The lamp body 11 is provided with a lens 12 at the front opening thereof and a cover 13 at the rear opening thereof to define a lamp chamber 14. The lamp chamber 14 is provided with a fixed reflector 21 mounted in the upper region and a swivel reflector 31 disposed in the lower region. The fixed reflector 21 is fixed in the lamp body 11 by means of a screw or the like, not shown. A discharge bulb 23 is mounted in the fixed reflector 21 together with a shade 24, so as to be constructed as a fixed lamp 20 having a prescribed luminous intensity distribution characteristic toward the front of the motor vehicle. The swivel reflector 31 is interposed between the upper plate 151 and the lower plate 152 of the supporting bracket 15 mounted in the lamp body 11. Further, the swivel reflector 31 is fitted and supported so as to be capable of rotating in the horizontal direction about a supporting shaft 32 projected from the upper surface of the swivel reflector 31, and is provided therein with a halogen bulb 33 mounted together with a shade 34. An actuator 4 to be driven by the ECU 2 shown in FIG. 1 is fixed on and supported by the stem 153 projected downward from the lower surface of the supporting bracket 15 on the lower side of the lower plate 152 of the supporting bracket 15 by means of a screw 16. The revolving output shaft 44 of the actuator 4 is connected to the bearing portion 35 provided on the lower surface of the swivel reflector 31 at the coaxial position with the supporting shaft 32, so that the swivel reflector 31 is driven and rotated by a rotational driving force of the revolving output shaft 44, and constructs a swivel lamp 30 of which the direction of radiation can be deflected toward the left and the right.

The lamp body 11 is provided with a tilting bracket 17 formed into substantially L-shape mounted therein, and on the bottom plate 171 thereof, there is provided the swivel lamp 30, that is, the actuator 4, the swivel reflector 31, the supporting bracket 15 and the like. The tilting bracket 17 is supported in the lamp body 11 by a bolt shaped horizontal shaft 172 via the supporting strips 172 provided on the lower portion on both sides thereof so as to be capable of tilting in the vertical direction. From a part of the upper portion of the back surface of the backboard 174 of the tilting bracket 17, a shaft for a tilting motion 175 having a spherical shaped portion at the tip thereof is projected toward the rear.

The leveling mechanism 5 is disposed on the lower region of the lamp body 11, so that the tilting bracket 17 can be tilted in the vertical direction. The leveling mechanism 5 comprises a leveling actuator 51 having a leveling shaft 52 projecting forward, and the leveling actuator 51 is fixed on the back surface of the lamp body 11 in a state in which the leveling shaft 52 is projected toward the inside of the lamp body 11. The leveling shaft 52 is provided with a ball bearing portion 53 at the tip thereof, which is fitted on and connected to the spherical portion of the shaft for a tilting motion 175 projecting rearward from the tilting bracket 17. The leveling mechanism 5 is constructed in such a manner that when the required signal is entered into the leveling actuator 51, the solenoid provided therein is activated according to the level of the signal, and allows the leveling shaft 52 to extend and contract in the longitudinal direction. Therefore, the ball bearing portion 53 of the leveling shaft 52 is moved in the fore-and-aft direction in the lamp body 11, which in turn allows the tilting bracket 17 to move in the fore-and-aft direction along with the shaft for a tilting motion 175, and consequently, the tilting bracket 17 is tilted in the vertical direction about the horizontal shaft 173. Therefore, the optical axis of the swivel lamp 30 is adjusted in the vertical upward and downward direction along with the tilting bracket 17.

Figure 4:
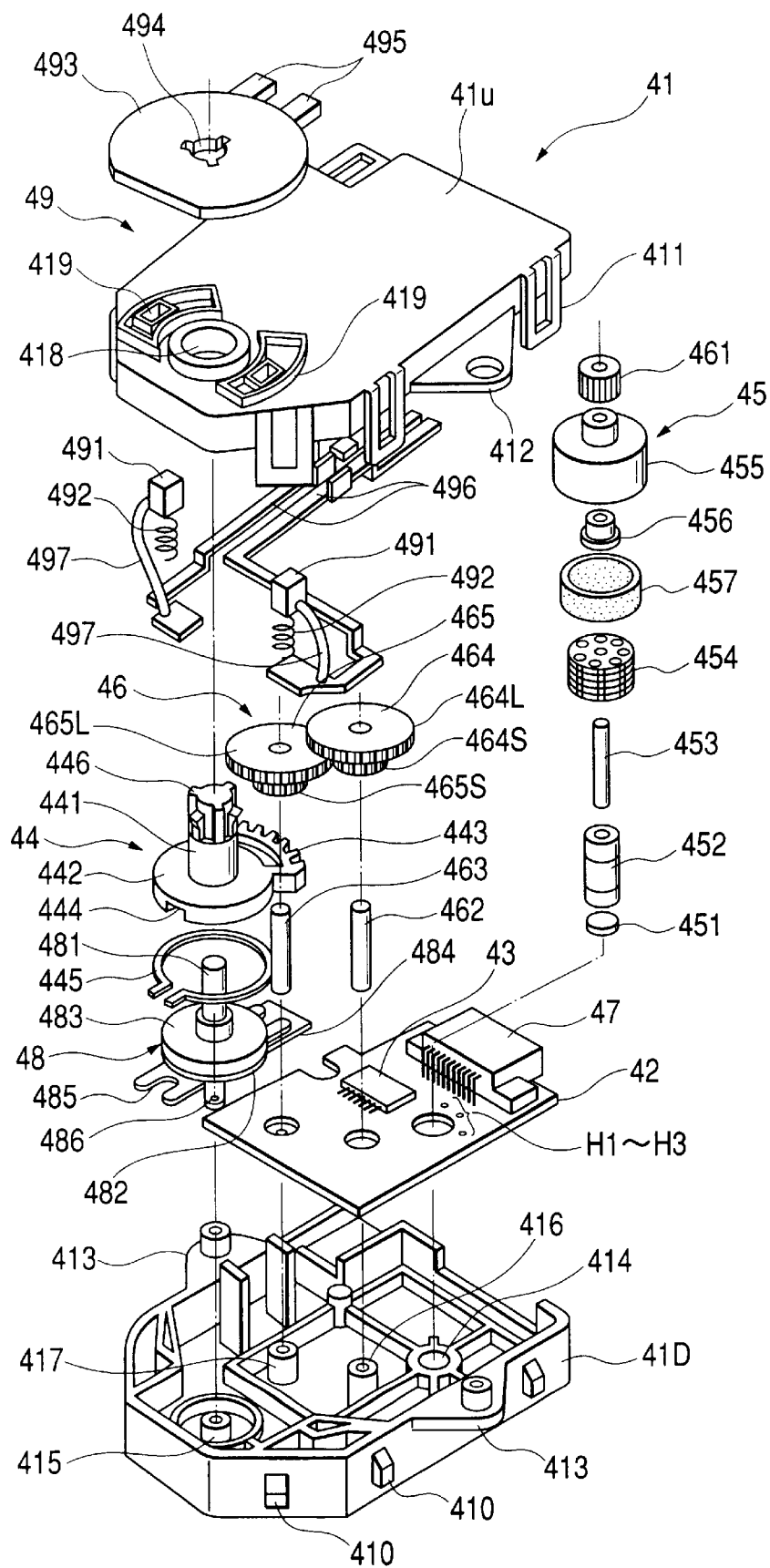
FIG. 4 is a partial exploded perspective view of the actuator according to the first embodiment.
Figure 5:
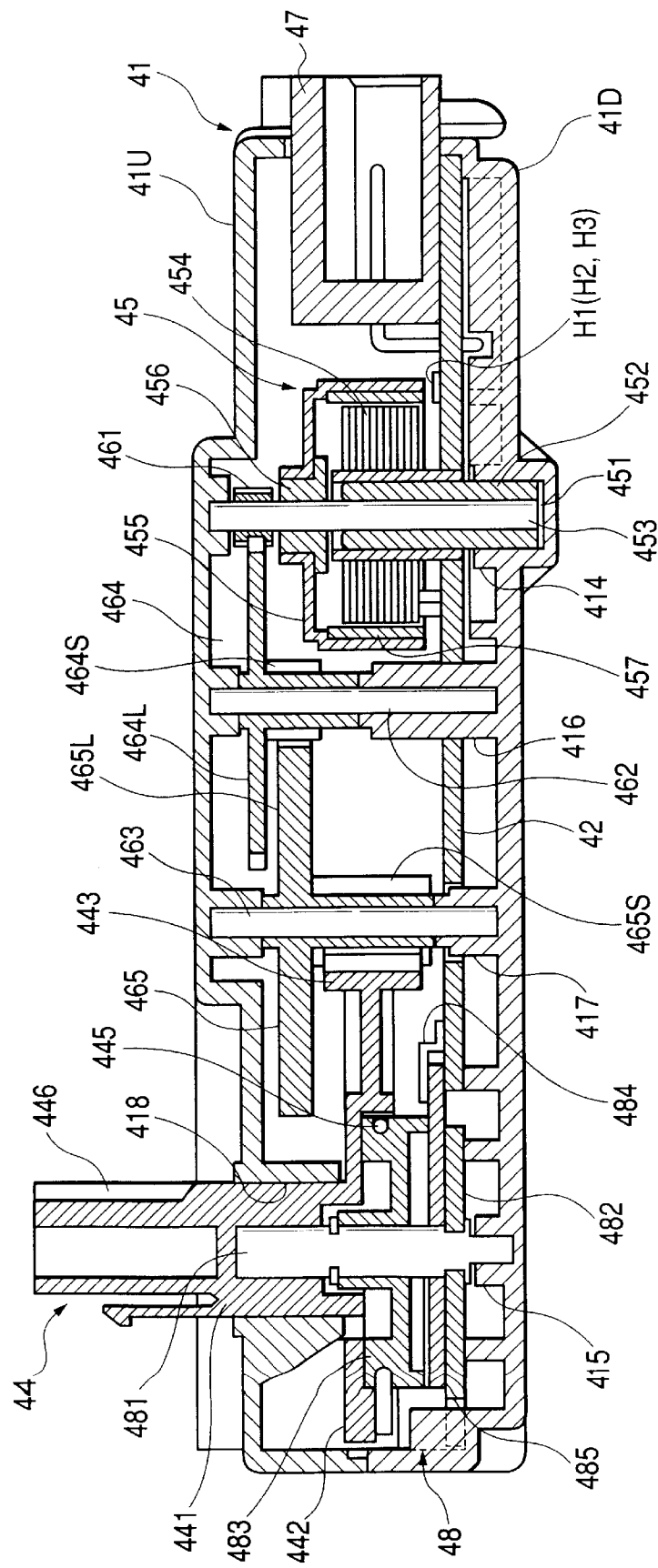
FIG. 5 is a vertical cross section of the actuator according to the first embodiment.

FIG. 4 is an exploded perspective view of the principal portion of the actuator 4 for allowing the swivel reflector 31 to make a swiveling motion (hereinafter, the single word actuator means this type of actuator), and FIG. 5 is a vertical cross section in its assembled state. The case 41 comprises a lower half 41D and the upper half 41U, and the projection 410 on the lower half 41D and the fitting strip 411 of the upper half 41U are fitted with respect each other. The upper half 41U and the lower half 41D are formed with the supporting strips 412, 413 projecting therefrom for supporting the fixed bracket 15 toward both sides respectively. The case 41 contains a printed board 42 having an electronic part 43 as a control circuit that will be described later, the revolving output shaft 44 for directly rotating the swivel reflector 31, a brushless motor 45 as a driving source for rotating the revolving output shaft 44, and a speed reducing gear mechanism 46 for transmitting a rotational force of the brushless motor 45 to the revolving output shaft 44 mounted thereon. The revolving output shaft 44 is provided with a potentiometer 48 as lamp deflecting angle detecting means disposed coaxially therewith. The printed board 42 is provided with a connector 47 to which the vehicle-mounted power cable, not shown, is connected for supplying electric power to the brushless motor 45 and the halogen lamp 33 of the swivel lamp 30 respectively. The upper half 41U is provided with a movable contact mechanism 49 for electrically connecting the actuator 4 and the cable 36 of the halogen lamp 33 on the upper surface thereof.

Figure 6:
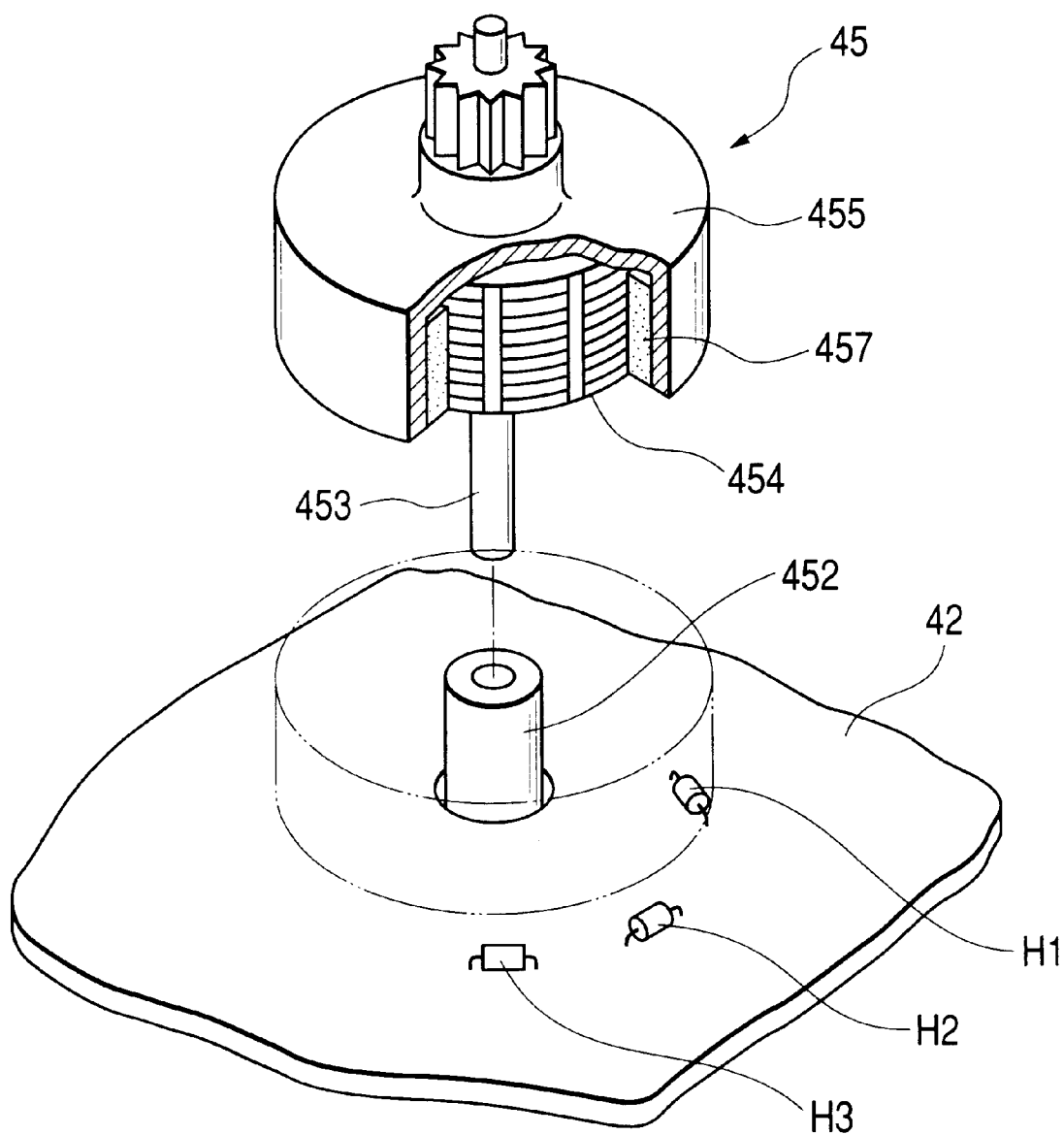
FIG. 6 is a partially enlarged perspective view of a brushless motor.

The brushless motor 45 comprises, as shown in FIG. 6 as a partially broken perspective view, a revolving shaft 453 supported in the boss hole 414 of the lower half 41D by means of a thrust bearing 451 and the bearing sleeve 452 so as to be capable of torsional rotation, a stator coil 454 fixed and supported on the printed board 42 around the revolving shaft 453, and a rotor 455 formed in the shape of a cylindrical container fixed to the revolving shaft 453 and mounted so as to cover the stator coil 454. The rotor 455 is fixed to the revolving shaft 453 by the rotor boss 456, and provided with a cylindrical rotor magnet 457 integrally on the inner surface thereof. The stator coil 454 comprises three pairs of coils equally distributed in the circumferential direction, and each pair of coils is fed with power via the printed wiring of the printed board 42, not shown, and magnetized into S-pole and N-pole alternately in the circumferential direction by such power feeding. The rotor magnet 457 is magnetized into S-pole and N-pole alternately in the circumferential direction corresponding to the stator coil 454. In the brushless motor 45, by supplying alternate current having different phases, that is, three phase current with respect to three coils of the stator coil 454, the rotor magnet 457, that is, the rotor 455 and the revolving shaft 453 are driven to rotate. In addition, as shown in FIG. 6, a plurality of, in this case, three hall elements H1, H2, H3 are disposed and supported on the printed board 42 at required intervals along the circumferential direction of the rotor 455, so that the magnetic field in each hall element H1, H2, H3 is changed when the rotor magnet 457 is rotated along with the rotor 455, and the state of each hall elements H1, H2, H3 is changed between ON and OFF to supply pulse signal corresponding to the cycle of rotation of the rotor 455.

The potentiometer 48 is provided with a fixed substrate 482 fixed on the fixed shaft 481 passing through the printed board 42 and standing upright in the boss hole 415 of the lower half 41D, and having a resistance pattern, not shown, formed on the surface thereof, and a rotary disc 483 rotatably supported on the fixed shaft 481 so as to face toward the fixed substrate 482 in the axial direction, and having a sliding contact point, not shown, for sliding on the surface of the resistance pattern. The fixed substrate 482 is prevented from rotating with respect to the lower half 41D by engaging the engaging projection 485 provided on a part of the circumference with a part of the inner wall of the lower half 41D. The rotary disc 483 is formed with an adjusting strip 486 projected from a part of the circumference thereof. This potentiometer 48 is constructed in such a manner that a rotary motion of the rotary disc 483 varies the sliding position of the sliding contact point on the surface of the resistance pattern, which in turn varies the resistance value of the resistance pattern provided on the fixed substrate 482, and the resistance value is supplied from the electrode terminal 484 on the fixed substrate 482 as the rotational position of the revolving output shaft, or as the deflection angle detected signal of the swivel reflector 31.

The revolving output shaft 44 is adapted to be connected with the rotary disc 483 of the potentiometer 48 via a clutch, and comprises a hollow shaft 441 covered on the fixed shaft 481 of the potentiometer 48 so as to be capable of torsional rotation, a clutch cylinder 442 in the shape of a short cylinder integrally provided at the lower end portion of the hollow shaft 441, and a sector gear 443 formed integrally along a part of the outer periphery of the clutch cylinder 442. The clutch cylinder 442 is disposed so as to cover the rotary disc 483 and provided at a part of the circumference thereof with a notch 444. A clutch spring 445 formed by bending the spring wire material into a substantially circular shape and being resiliently attached on the peripheral surface of the rotary disc is engaged with the notch 444 at both ends, whereby the clutch cylinder 442 is connected to the rotary disc 483 via the clutch spring 445 so as to be frictional in the direction of rotation. Therefore, by rotating the revolving output shaft 44, or the clutch cylinder 442, by manual operation in a state in which rotation of the rotary disc 483 is locked by holding the adjusting strip 486 projected from a part of the circumference of the rotary disc 483 with a jig or the like, relative position between the potentiometer 48 and the revolving output shaft 44 in the direction of rotation can be adjusted by rotating the revolving output shaft 44 in a sliding motion with respect to the rotary disc 483 by the frictional connection of the clutch spring 445. The relative position adjustment is utilized for zero adjustment of the output from the potentiometer 48.

The speed reducing gear mechanism 46 is provide in the region between the brushless motor 45 and the sector gear 443 of the potentiometer 48. The speed reducing gear mechanism 46 comprises a drive gear 461 mounted on the revolving shaft 453 of the brushless motor 45 and a first gear 464 and a second gear 465 rotatably supported respectively on two fixed shafts 462, 463 passing through the printed board 42 and standing upright at a required interval in the boss holes 416, 417 of the lower half 41D. The first gear 464 and the second gear 465 comprises integrally formed larger gears 464L, 465L and smaller gears 464S, 465S respectively. The drive gear 461 engages the larger gear 464L of the first gear 464, and the smaller gear 464S of the first gear 464 engages the larger gear 465L of the second gear 465, and then the smaller gear 465S of the second gear 465 engages the sector gear 443. Accordingly, a rotational force of the brushless motor 45 is reduced by the speed reducing gear mechanism 46 and transmitted to the sector gear 443, so that the revolving output shaft 44 is rotated at a reduced speed. The upper end portion of the revolving output shaft 44 is formed as a spline shaft 446 and passed through the output shaft hole 418 formed on the upper half 41U and projected from the upper surface of the case 41, so as to be fitted in the spline groove on the bearing portion 35 provided on the lower surface of the swivel reflector 31 to allow the swivel reflector 31 to rotate integrally by a rotational force of the revolving output shaft 44.

The movable contact point mechanism 49 disposed on the upper surface of the upper half 41U comprises a pair of contact point brushes 491 contained in the case 41, partially exposed part of them through a pair of rectangular holes 419 formed on the upper surface on a circumference and urged into the projecting direction by the springs 492, and a contact plate 493 having a spline shaft hole 494 for fitting the spline shaft 446 of the revolving output shaft 44 therein so as to be rotated integrally with the revolving output shaft 44 in the direction of rotation in the region above the contact point brushes 491. The contact point plate 493 is provided on the lower surface thereof with a pair of contact point strips (not shown) extending therefrom for sliding contact with the contact point brushes 491, so as to be capable of rotating together with the revolving output shaft 44 in a state in which the electrical contact with the contact point brushes 491 is maintained. The contact point plate 493 is provided with an electrode terminal 495 continuing to the contact point strip, and the electrode terminal 495 may be attached and detached with a connector, not shown, of the cable 36 connected to the halogen lamp 33 of the swivel lamp 30 shown in FIG. 2. The pair of contact point brushes 491 are connected to the ends of a pair of narrow conductive plates 496 extending respectively in the case 41 via the conductive wires 497, which in turn is electrically connected to the vehicle mounted power source, not shown, by a connector, not shown, to be connected to the other ends of the conductive plates 495. Accordingly, the movable contact point mechanism 49 electrically connects the halogen lamp 33 with the vehicle-mounted power source, and prevents the cable 36 for connecting the swivel lamp 30 and the actuator 4 from becoming kinked when the swivel reflector 31 of the swivel lamp 30 is moved, thereby ensuring smooth rotational movement of the swivel reflector 31.

Figure 7:
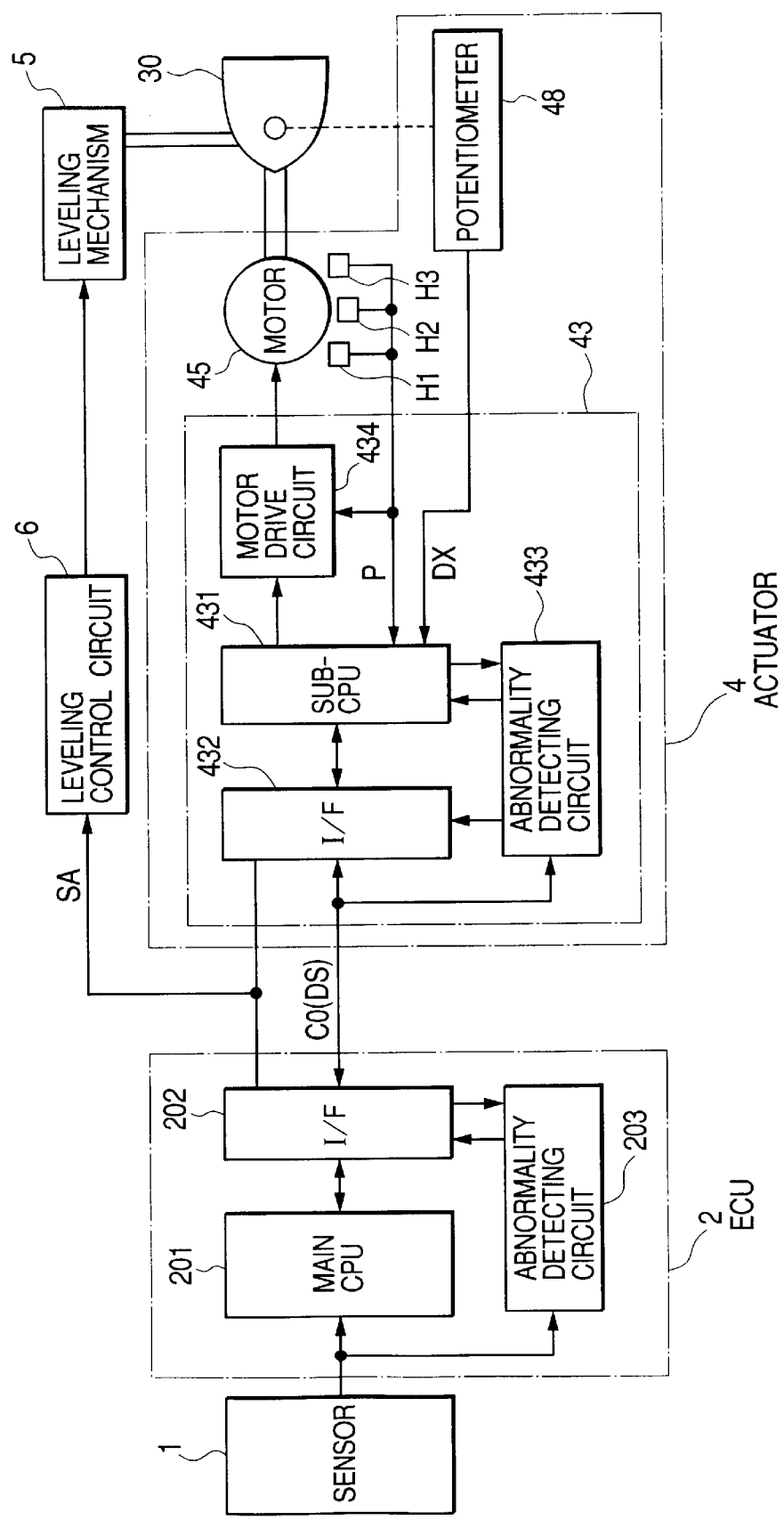
FIG. 7 is a block circuit diagram showing a circuit construction of the AFS.

FIG. 7 is a block circuit diagram showing the construction of the electric circuit of the ECU 2 and the actuator 4. The actuator 4 and the leveling mechanism 5 are mounted on the left and right swivel lamps 3L, 3R of the motor vehicle respectively, and being able to intercommunicate with the EUC 2. The ECU 2 contains a main CPU 201 for processing by a prescribed algorithm based on information from the aforementioned sensor 1 to output the required control signal CO, an interface circuit 202 for feeding and receiving the control signal CO between the main CPU 201 and the actuator 4 (hereinafter referred to as I/F), and an abnormality detecting circuit 203 for observing the various signals in the ECU 2 including the main CPU 201 and supplying the abnormality-detected signal when abnormality is detected. The function of the abnormality detecting circuit 203 may be performed by the main CPU 201.

The controlling circuit 43 comprising electronic components contained in the actuators 4 provided respectively in the swivel lamps 30 provided in the left and right swivel type lights 3L, 3R of the motor vehicle comprises an I/F circuit 432 for feeding and receiving the signal to and from the ECU 2, a sub-CPU 431 for processing by a prescribed algorithm based on the signal entered form the I/F circuit 432, pulse signal P fed from the hall elements H1, H2, H3, and the deflection angle detected signal DX entered from the potentiometer 48, an abnormality detecting circuit 433 for observing signals supplied through the I/F circuit 432 and supplying an abnormality-detected signal to the sub-CPU 431 when such signals are determined to be abnormal, and a motor drive circuit 434 for driving and rotating the brushless motor 45. It is also possible to make the sub-CPU 431 function as the abnormality detecting circuit 433. The deflection angle signal DS of the swivel lamp 30 is supplied from the ECU 2 as a part of the aforementioned control signal, and entered into the actuator 4.

The main CPU 201 of the ECU 2 and the sub-CPU 4 of the actuator 4 are connected to the leveling control circuit 6 for driving and controlling the leveling mechanism 5 via the I/F circuits 202, 432 respectively, so that the leveling control circuit 6 adjusts the optical axis of the swivel lamp 30 in the vertical direction by the leveling mechanism 5 especially when abnormality occurred and the optical-axis-downward signal SA is supplied from the respective CPU 201, 431 toward the leveling control circuit 6, and the optical axis of the swivel lamp 30 is adjusted downward in comparison with the normal condition especially when the abnormality, which will be described below, is detected.

FIG. 8 is a circuit diagram showing a frame format of the motor drive circuit 434 and the brushless motor of the actuator 4. A switching matrix circuit 435 for receiving speed control signal V, start/stop signal S, normal/reverse rotation signal R respectively from the sub-CPU of the actuator 4 as control signal, and pulse signal from the three hall elements H1, H2, H3, and an output circuit 436 for adjusting the phase of electric power in three phases (U phase, V phase, and W phase) to be supplied to three pairs of coils in the stator coil 454 of the brushless motor 45 upon receipt of the output from the switching matrix circuit 435. In this motor drive circuit 434, supplying each electric power of U phase, V phase, and W phase to the stator coil 454 rotates the magnet rotor 457, and thus the rotor 455 and the revolving shaft 453 integrated therewith rotate. When the magnet rotor 457 rotates, each hall element H1, H2, H3 detects variations in magnetic field, and then supplies pulse signal P. The pulse signal P is entered into the switching matrix circuit 435, and the switching operation in the output circuit 436 is performed in exact timing with the pulse signal supplied into the switching matrix circuit 435, so that the rotation of the magnet rotor 457 continues. The switching matrix circuit 435 supplies a required control signal C1 to the output circuit 436 base on speed control signal V, start/stop signal S, and normal/reverse rotation signal R from the sub-CPU 431. The output circuit 436, upon receipt of the control signal C1, adjusts the phase of electric power in three phases to be supplied to the stator coil 454 to control the start and stop of the rotational motion, the direction of rotation, and speed of rotation of the brushless motor 45. The output from the potentiometer 48 provided in the actuator 4 is entered into the sub-CPU 431. The sub-CPU 431 receives a part of the pulse signal P supplied from each hall element H1, H2, H3, and recognizes the rotating state of the brushless motor 45.

According to the construction described above, as shown in FIG. 1, when information on the steering angle of the steering wheel SW of the motor vehicle, the speed of the motor vehicle, and other traveling state of the motor vehicle is supplied from the sensor 1 disposed in the motor vehicle into the ECU 2, the ECU 2 performs calculation in the main CPU 201 based on the supplied sensor outputs, calculates the deflection angle signal DS of the swivel lamp 30 of the swivel type lights 3L, 3R in the motor vehicle, and enters it into the respective actuators 4 of the swivel type lights 3L, 3R. Then, in the actuator 4, the sub-CPU 431 performs calculation based on the supplied deflection angle signal DS, calculates the signal corresponding to the deflection angle signal and supplies to the motor drive circuit 434, and drives and rotates the brushless motor 45. Since the rotational drive force of the brushless motor 45 is decelerated in the speed reducing gear mechanism 46 and transmitted to the revolving output shaft 44, the swivel reflector 31 connected to the revolving output shaft 44 rotates in the horizontal direction, and the direction of the optical axis of the swivel lamp 30 is varied. When the swivel reflector 31 makes a rotary motion, the rotary disc 483 of the potentiometer 48 is rotated with the rotation of the revolving output shaft 44, and thus the rotating angle of the revolving output shaft 44, or the deflecting angle of the swivel reflector 31 is detected based on variations in resistance value when the sliding contact point is slid on the surface of the resistance pattern on the fixed substrate 482 by a rotary motion of the rotary disc 483, and the deflection angle detected signal DX is entered into the sub-CPU 431. The sub-CPU 431 then compares the deflection angle detected signal DX with the deflection angle signal DS supplied form the ECU 2, and performs feedback control on the rotating angle of the brushless motor 45 to make them coincide with each other, so that the direction of the optical axis of the swivel reflector 31, or the direction of the optical axis of the swivel lamp 30 can be controlled to the angular position set by the deflection angle signal DS with high degree of accuracy.

With such deflecting motion of the swivel reflector 31, in both of the swivel type lights 3L, 3R, light directed in the straight ahead direction of the motor vehicle emitted from the fixed lamp 20 and deflected light emitted from the swivel lamp 30 are joined to illuminate the area including the left and right areas deflected from the straight ahead direction of the motor vehicle, so that not only the straight ahead direction of the motor vehicle, but also the front area in the steered directions can be illuminated during travel of the motor vehicle, thereby enabling enhancement of driving safety.

However, in such AFS, a failure based on the following failures may occur in the sensor 1, the ECU 2, the actuator 4.

A: sensor failure
a1: vehicle speed sensor failure
a2: steering sensor failure
a3: other sensor failure
B: ECU failure
b1: main CPU failure (power supply system, overdrive)
b2: I/F circuit failure
C: actuator failure
c1: sub-CPU failure (power supply system, overdrive)
c2: brushless motor failure
c3: potentiometer failure
c4: mechanical (speed reducing mechanism, etc.) failure
c5: I/F circuit failure
D: failure of signaling system
d1: failure of signaling system from sensor to ECU d2: failure of signaling system from ECU to the actuator When such a failure occurred, the optical axis of the swivel lamp 30 becomes motionless in the deflected state, and thus the unfavorable state in terms of traffic safety, such that oncoming cars are dazzled as described above, may occur. When such a failure occurred, the ECU 2 and the actuator 4 communicates with each other in both directions and abnormality detected signal is supplied from the respective abnormality detecting circuits 203, 433 contained therein. In the case of the failures A, D, the abnormality detecting circuit 203 of the ECU 2 can detect abnormality, and in the case of the failures B, C, D, the abnormality detecting circuit 433 of the actuator 4 can detect abnormality. In either cases, abnormality detected signal is entered into the main CPU 201 or into the sub-CPU 431, and then fed from each of the CPU 201, 431 into the leveling control circuit 6 as optical-axis-downward signal SA. Upon receipt of optical-axis-downward signal SA, the leveling control circuit 6 supplies a required signal to the leveling mechanism 5, and the leveling actuator 51 moves the leveling shaft 52 forward to tilt the upper portion of the tilting bracket 17 forward about the horizontal shaft 172. Accordingly, the swivel reflector 31 is tilted forward, and the optical axis of the swivel lamp 30 is adjusted downwardly.

Figure 9A:
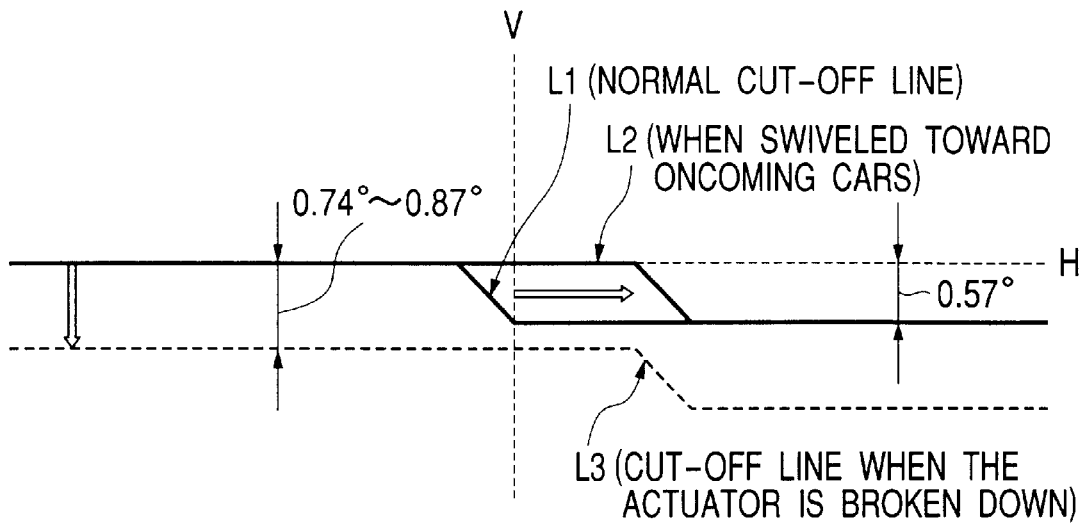
FIG. 9 is a drawing showing luminous intensity distribution characteristic for illustrating the operation to adjust the optical axis downward when a failure occurred.

FIG. 9(a) shows a luminous intensity distribution characteristic (line L1) when the optical axis of the swivel lamp is at a prescribed vertical angle, and a luminous intensity distribution characteristic (line L2) is when the optical axis of the swivel lamp 30 is controlled toward the oncoming cars at a prescribed deflection angle in the horizontal direction at the same moment. In Japan, the motor vehicle must keep left, and thus the cut-off line of the luminous intensity distribution characteristic slopes downward by 0.57° near the vertical axis (V). When abnormality occurred in the swivel lamp 30 in this deflected condition, and the deflection angle of the swivel lamp is fixed, the illuminating radiation from the swivel lamp 30 stays in the direction toward oncoming cars, and thus dazzles the oncoming cars, which is not favorable in terms of traffic safety. In this case, by adjusting the optical axis of the swivel lamp 30 downward as in the present invention, the cut-off line of the luminous intensity distribution characteristic slopes downward from the horizontal line (H) only by about 0.740° to 0.870° as shown by the line L3, and thus dazzling of oncoming cars is prevented even when the deflection angle in the horizontal direction of the swivel lamp 30 is fixed in the aforementioned state, which is favorable in terms of ensurement of traffic safety.

Figure 10:
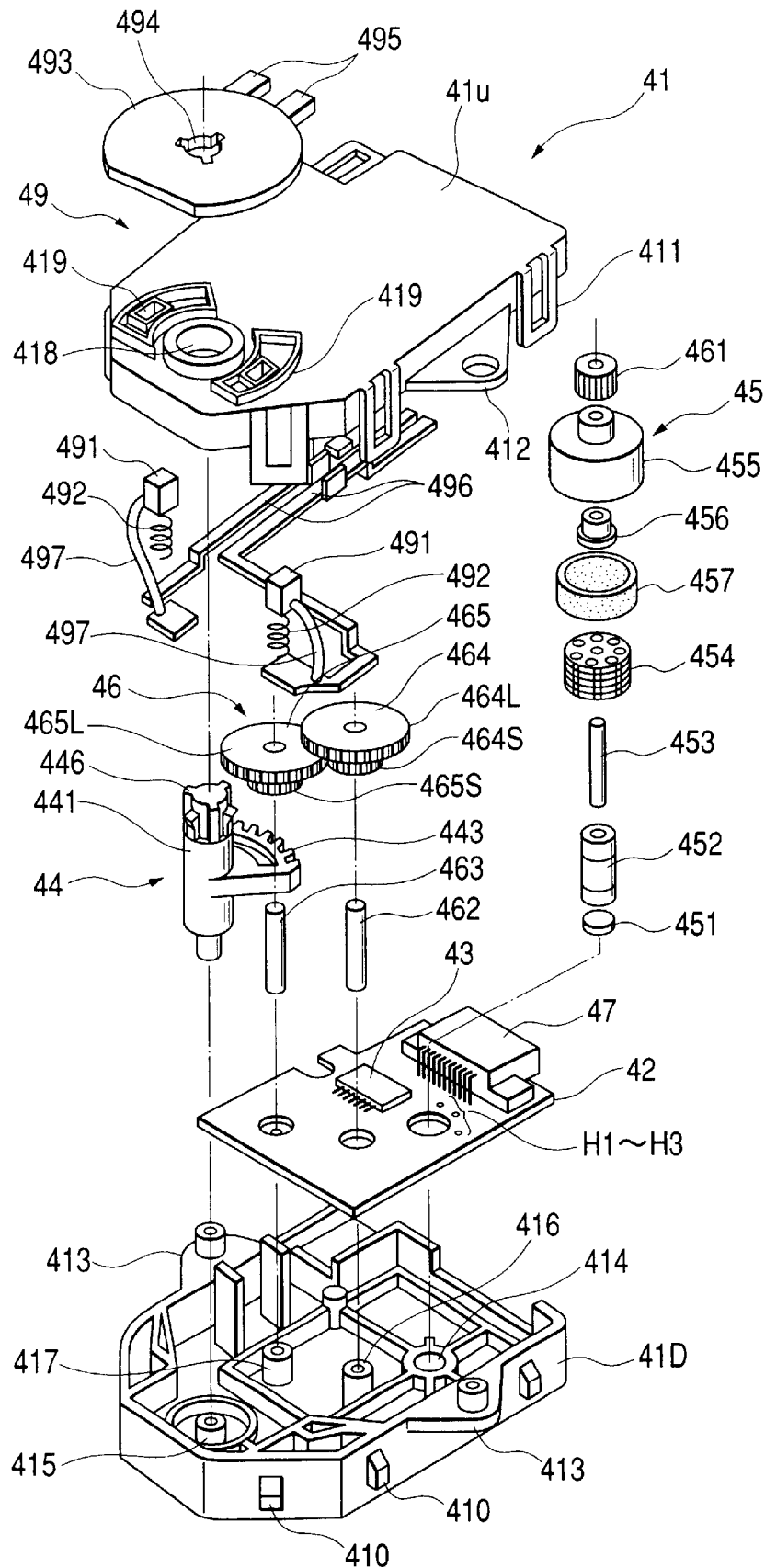
FIG. 10 is a partial exploded perspective view of the actuator according to a second embodiment.
Figure 11:
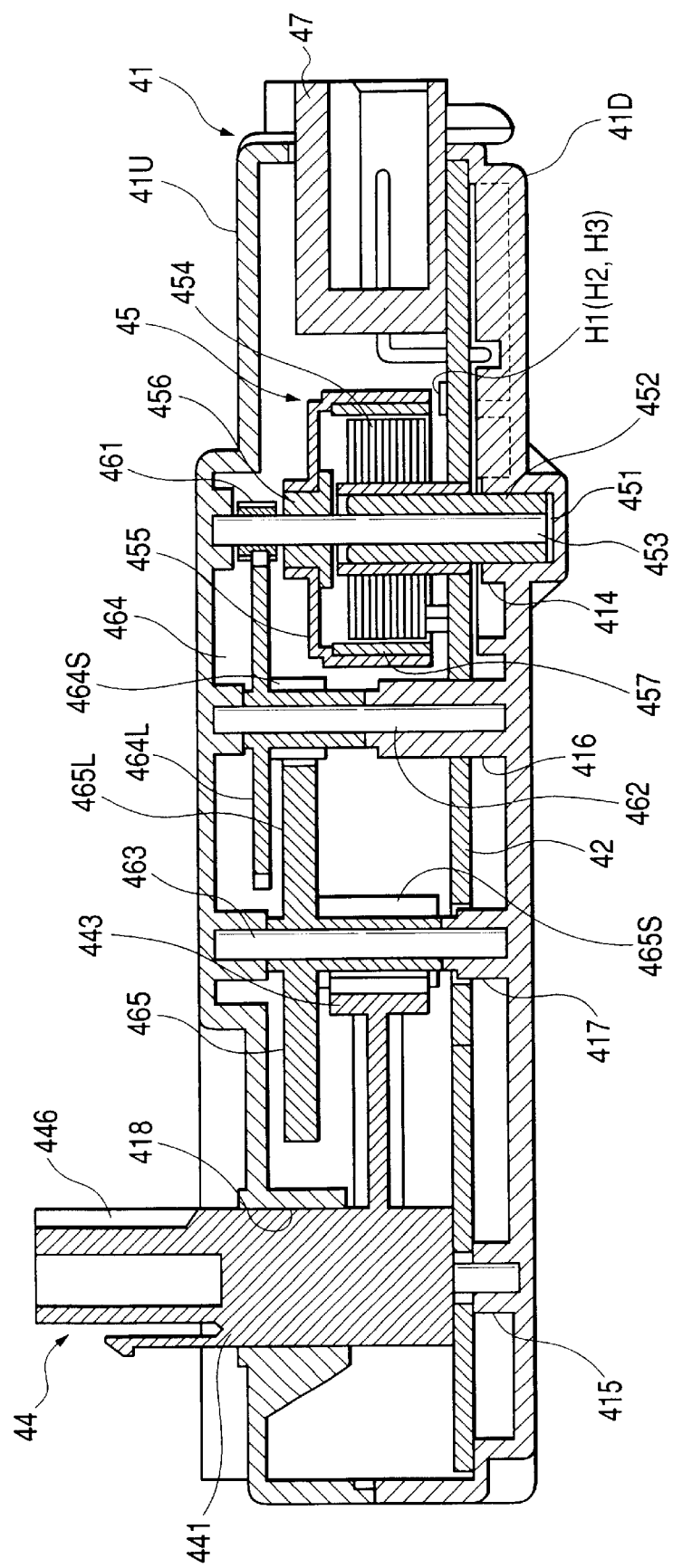
FIG. 11 is a vertical cross section of the actuator according to the second embodiment.

A second embodiment of the present invention will now be described. Though an example of the actuator in which the deflecting angle position of the swivel lamp 30 is controlled based on the deflection angle detected signal of the potentiometer 48 is shown in the first embodiment, it is also possible to construct the actuator in such a manner that the deflection angle of the swivel lamp 30 is controlled in the desired angular position utilizing pulse signals supplied from the hall elements H1, H2, H3 provided on the brushless motor 45. In order to construct such an actuator, the potentiometer must only be removed from the actuator shown in FIG. 4 and FIG. 5, which is shown in FIG. 10 and FIG. 11 as an example. In this case, the revolving output shaft 44 must only be adapted to be rotated by the speed reducing gear mechanism 46, and in this embodiment, it must only be constructed in such a manner that the revolving shaft portion (in this case, it is not necessary to construct it as a hollow revolving shaft) 441 is directly supported in the case 41 with the upper end portion 446 of the revolving output shaft 44 projected from the upper surface of the case 41, and the revolving shaft portion 441 is provided with a sector gear 443 at a portion thereof to be engaged with the second gear 465. Therefore, the fixed substrate 482 and the rotary disc 483 that constitute the potentiometer 48 as in the first embodiment is not necessary, and in addition, the clutch cylinder 442 and the clutch spring 445 of the revolving output shaft 44 is not necessary, which is advantageous in simplifying the construction of the actuator 4 and in downsizing the same. The circuit structure of the actuator 4 in this case is the structure in which the potentiometer 48 is removed from the circuit diagram in FIG. 7 and FIG. 8.

Figure 12:
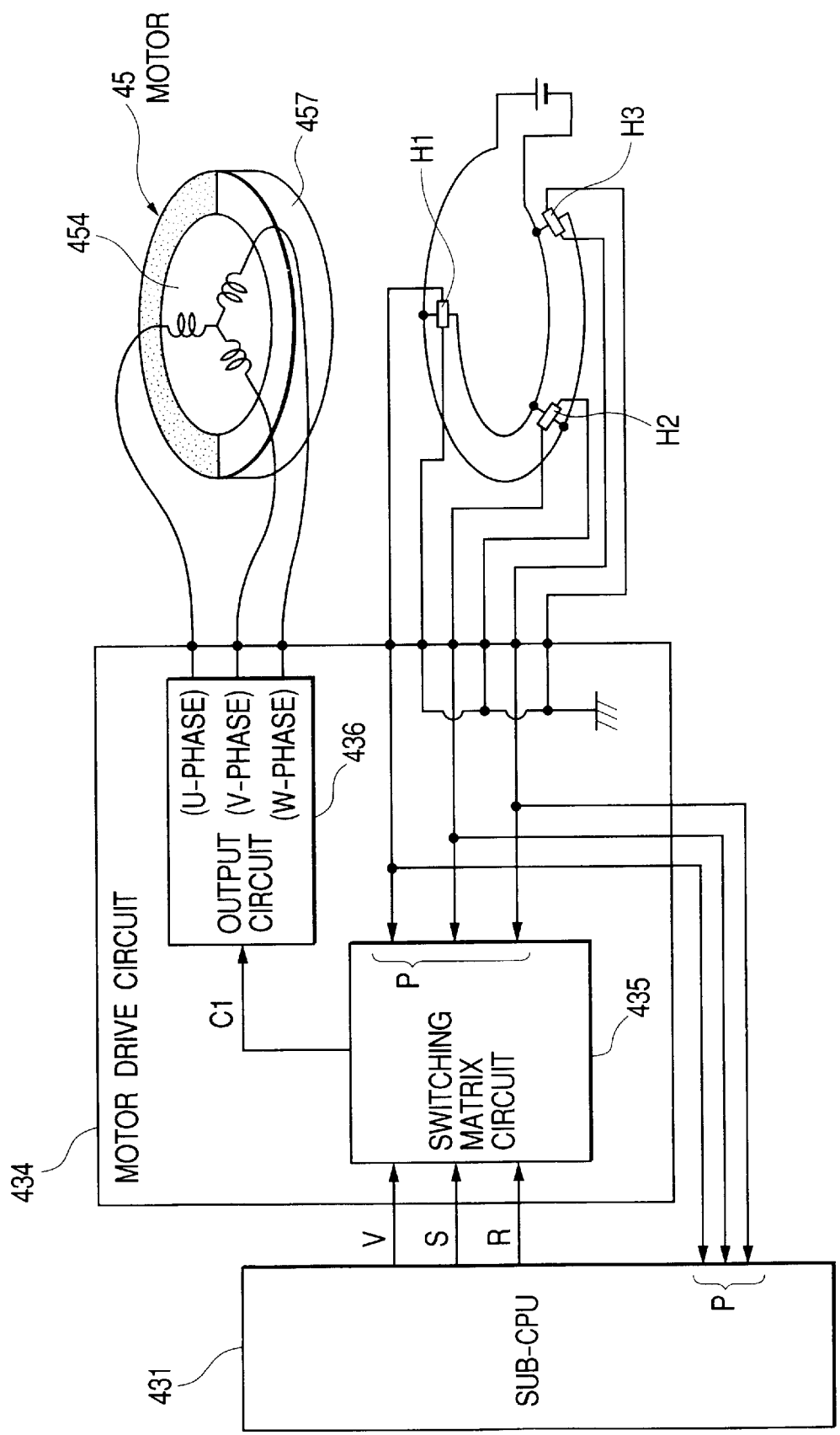
FIG. 12 is a circuit diagram showing a circuit construction of the actuator according to the second embodiment.
Figure 13:
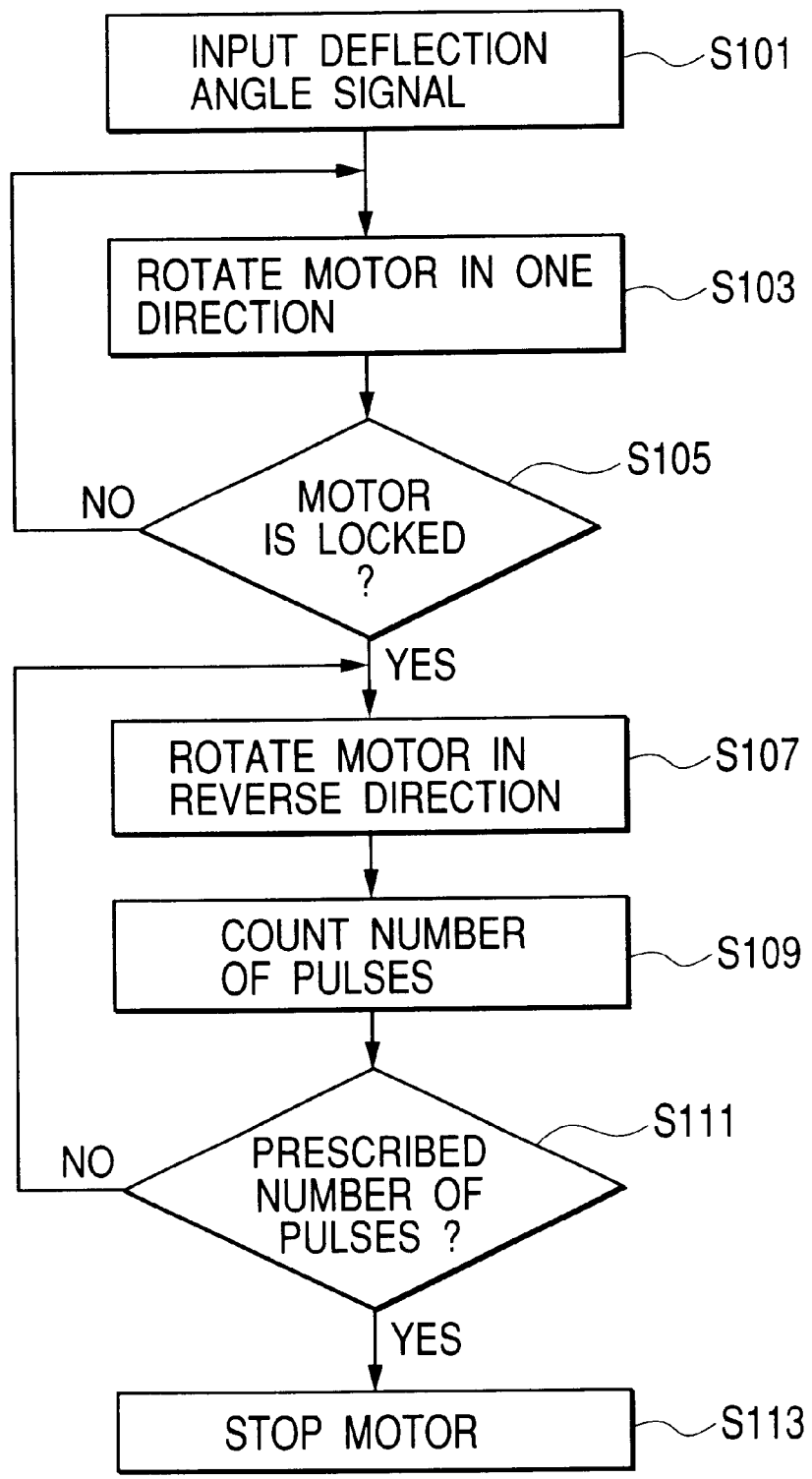
FIG. 13 is a flow chart for illustrating the operation for setting the position of the deflection angle according to the second embodiment.
Figure 14:
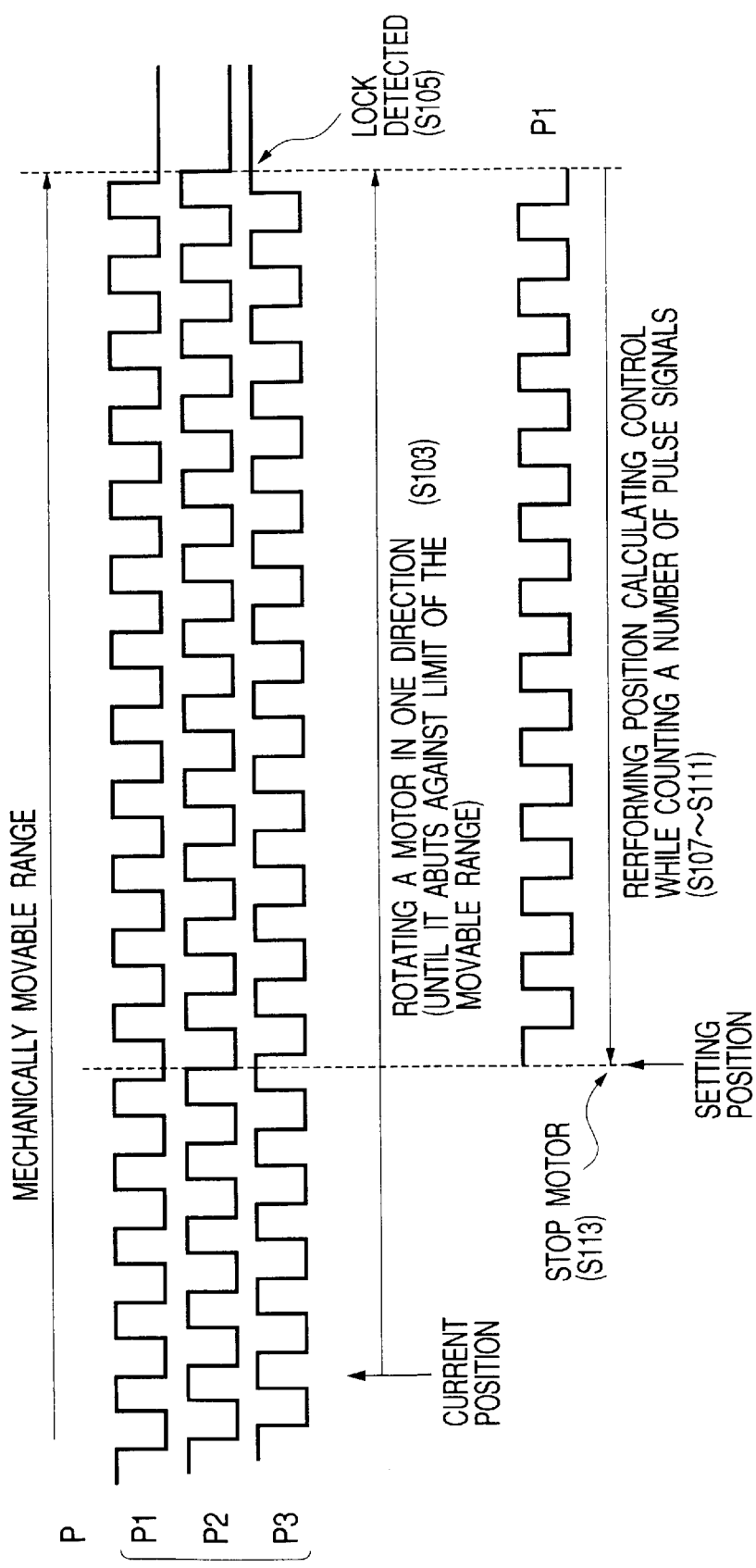
FIG. 14 is a signal waveform chart for illustrating the operation for setting the position of the deflection angle according to the second embodiment.

In the second embodiment, the method of setting the swivel lamp 30 in the desired deflection position using pulse signals P from the hall elements H1, H2, H3 will be described. The operation of adjusting the optical axis of the swivel lamp 30 downward when a failure occurred in the AFS is the same as the first embodiment. FIG. 12 is a circuit diagram of the actuator according to the second embodiment. FIG. 13 is a flow chart showing the deflectional angular position setting operation, and FIG. 14 is a waveform chart of pulse signals P (P1, P2, P3) supplied from the three hall elements H1, H2, H3 provided on the brushless motor 45. When setting the swivel lamp 30 in a desired deflectional angular position, the deflection angle signal DS from the sub-CPU 431 is entered (S101), and the motor drive circuit 434 forces the brushless motor 45 to rotate in one direction continuously by the deflection angle signal DS (S103). As is described above, since the rotational force of the revolving shaft 453 of the brushless motor 45 is transmitted to the revolving output shaft 44 via the speed reducing mechanism 46 to rotate the sector gear 443 integrated with the revolving output shaft 44, engagement between the portion of the sector gear 443 in the direction of rotation and the smaller gear 465S of the second gear 465 is brought into the locked state, and further rotation is blocked. When such locked state is effected, the brushless motor 45 is also brought into the locked state, and the pulse signals P (P1, P2, P3) from the hall elements H1, H2, H3 are fixed to a constant level, and thus the sub-CPU 431 recognizes that the blushless motor 45 is in the locked state (S105).

Subsequently, the sub-CPU 431 supplies the reverse rotation signal to the motor drive circuit 434 to start rotation of the brushless motor 45 in the reverse direction (S107), and at the same time, the number of pulses of pulse signal P1 from at least one hall element out of the hall elements H1, H2, H3, in this case, from H1, is counted (S109). Since correlation between the counted value of the pulse signal P1 and the amount of rotating angle of the brushless motor 45, in other words, correlation between the number of pulses and the deflectional angular position of the optical axis of the swivel lamp 30 can be determined in advance, the brushless motor 45 may be rotated by a prescribed amount of rotation by counting the number of pulses of pulse signal P1 at the moment when the brushless motor 45 is rotated from the end portion of the mechanically movable range in one direction of the brushless motor 45 toward the opposite direction by a desired amount (S111), and thus the optical axis of the swivel lamp 30 can be set to a prescribed deflectional angular position, and then rotation of the brushless motor is stopped (S113). Accordingly, the optical axis of the swivel lamp 30 can be set to the desired deflectional angular position, which can exercise desired failsafe capability in terms of traffic safety.

In this case, though not shown in the figure, by providing an up-down counter in the sub-CPU 431 and setting the zero count position of the up-down counter at the reference deflectional angular position, the counted value of the up-down counter and the deflectional angular position of the swivel lamp 30 can be parallelised, thereby facilitating setting of the deflection angle. In this case, the setting operation of the deflectional angular position shown in FIG. 13 and FIG. 14 can be utilized when zeroing the counted value of the up-down counter.

In the first embodiment, since the deflection angle of the swivel lamp 30 is detected by the potentiometer 48, it is largely affected by the accuracy of the potentiometer, and thus it is not easy to increase the setting accuracy of the deflection angle. Therefore, the potentiometer 48 is provided with an adjusting mechanism, which results in complexity of the construction. In the second embodiment, since the amount of rotation is obtained from the hall elements H1, H2, H3 of the brushless motor 45, and the deflection angle of the swivel lamp 30 is determined from the obtained amount of rotation, the deflection angle can be controlled with high degree of accuracy. Counting of the number of pulses of pulse signal can be made for any hall element. Alternatively, it is also possible to perform counting on all the pulse signals. Further, it is also possible to perform counting by determining the direction of rotation from the phase relation among signals from the hall elements H1, H2, H3. The locking state of the motor can also be recognized by detecting increase in motor current.

A modification of each embodiment is constructed in such a manner that when abnormality is detected in either one of the swivel lamps 30 of the swivel type lights 3R, 3L provided on the motor vehicle on the left side and the right side, only the optical axis of such one of the swivel lamps 30 is moved downward. In this case, the lamp from which no abnormality is detected may be swiveled as usual, or may be stopped in the state of facing the front. When it is swiveled as usual, the field of view can be advantageously ensured on the curved road or the like, and when it is stopped in the state of facing the front, it does not give a feeling of strangeness as a result of moving only one of the lamps and front visibility can be ensured advantageously while compensating the distribution of luminous intensity deflected in the lateral direction of the lamp of which the optical axis is lowered.

Figure 9B:
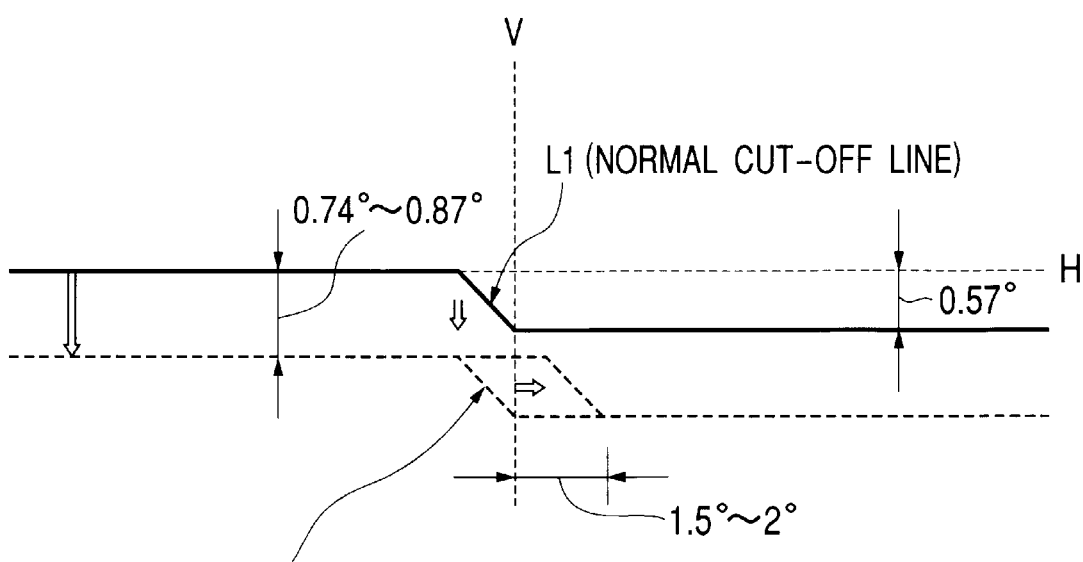

When abnormality is detected in either one of the swivel lamps 30 of the swivel type lights 3R, 3L provided on the motor vehicle on the left side and the right side, optical axes of both of the swivel lamps 30 may be lowered. In this case, the lamp from which no abnormality is detected may be fixed to face toward the right by approximately 1.5 to 2° from the front, so that front visibility is ensured. FIG. 9(*b*) is a drawing showing the luminous intensity distribution characteristic in such case, in which the optical axis is controlled as shown by the line L4.

In addition, it is also possible to construct the swivel lamp 30 in such a manner that when the leveling mechanism 5 or the leveling control circuit 6 is broken down and the optical axis of the swivel lamp 30 cannot be lowered any more, the swivel lamp 30 is turned off or dimmed.

Though an example of the AFS using the headlamp comprising the fixed lamp and the swivel lamp integrated with each other is shown as a swivel type light in the aforementioned embodiments, such construction that the swivel lamp, being formed as a single independent light, is used as an auxiliary lamp and combined with the headlamp comprising a fixed lamp to construct a swivel type light is also employed.

As is described thus far, the present invention, by providing means for adjusting optical axis of the lamp in the vertical direction constructed in such a manner that when abnormality is detected in the lamp deflection angle controlling means, the vertical angle of the optical axis of the lamp that is in the deflected state is set to the lower angular position than the reference angle, the lamp is prevented from dazzling oncoming cars even when the lamp is in the deflected state toward the oncoming cars, thereby realizing failsafe which is preferable in terms of traffic safety. In addition, by utilizing pulse signal supplied from the hall element attached on the motor when controlling the rotation of the motor, additional components aside from the existing motor are not necessary, thereby preventing increase in complexity of construction and in the cost.

What is claimed is:

1. A vehicle lighting apparatus comprising:

lamp deflection angle controlling means for controlling a deflection angle of a lamp in a horizontal direction corresponding to traveling conditions of a vehicle;

abnormality detecting means for detecting abnormality in said lamp deflection angle controlling means; and means for adjusting an optical axis of said lamp in a vertical direction for setting a vertical angle of the optical axis of said lamp to an angular position lower than a reference angle upon receipt of a abnormality-detected signal from said abnormality detecting means.

2. The vehicle lighting apparatus according to claim 1, wherein said means for adjusting the optical axis of said lamp in the vertical direction comprises:

a leveling mechanism for tilting said lamp in vertically upward and downward directions, wherein said leveling mechanism tilts the optical axis of said lamp downward upon receipt of the abnormality-detected signal.

3. The vehicle lighting apparatus according to claim 1, wherein said lamp deflection angle controlling means comprises:

a motor for varying the deflection angle of said lamp;

motor drive means for driving said motor;

a potentiometer for detecting the deflection angle of said lamp; and controlling means for controlling said motor drive means based on a signal from said potentiometer upon detection of the deflection angle in order to control an amount of rotation of said motor.

4. The vehicle lighting apparatus according to claim 2, wherein said lamp deflection angle controlling means comprises:

a motor for varying the deflection angle of said lamp;

motor drive means for driving said motor;

a potentiometer for detecting the deflection angle of said lamp; and controlling means for controlling said motor drive means based on a signal from said potentiometer upon detection of the deflection angle in order to control an amount of rotation of said motor.

5. The vehicle lighting apparatus according to claim 1, wherein said lamp deflection angle controlling means comprises:

a motor for varying the deflection angle of said lamp;

a motor drive means for driving said motor;

a hall element for supplying pulse signal along with a rotary motion of said motor; and controlling means for detecting a deflectional angular position of said lamp based on the signal from said hall element and for controlling said motor drive means to control an amount of rotation of said motor.

6. The vehicle lighting apparatus according to claim 2, wherein said lamp deflection angle controlling means comprises:

a motor for varying the deflection angle of said lamp;

a motor drive means for driving said motor;

a hall element for supplying pulse signal along with a rotary motion of said motor; and controlling means for detecting a deflectional angular position of said lamp based on the signal from said hall element and for controlling said motor drive means to control an amount of rotation of said motor.

7. The vehicle lighting apparatus according to claim 1, wherein said lamp deflection angle controlling means controls each deflection angle of a plurality of lamps provided on the vehicle, and wherein said means for adjusting the optical axis of said lamp tilts the optical axis of at least one of said lamps other than those in abnormal condition both downward and laterally so that said lamp irradiates a front.

8. The vehicle lighting apparatus according to claim 1, wherein said lamp deflection angle controlling means controls each deflection angle of a plurality of lamps provided on the vehicle, and wherein said means for adjusting the optical axis of said lamp tilts the optical axis of said lamp in abnormal condition downward, and wherein the optical axis of at least one of said lamps other than those in abnormal condition is swivelable in a horizontal direction without tilting the optical axis thereof downward.

9. The vehicle lighting apparatus according to claim 1, wherein said lamp deflection angle controlling means controls each deflection angle of a plurality of lamps provided on the vehicle, and wherein said means for adjusting the optical axis of said lamp tilts the optical axis of said lamp in abnormal condition downward, and wherein the optical axis of at least one of said lamps other than those in abnormal condition is stopped in a state of facing the front without tilting the optical axis thereof downward.

* * * * *